United States Patent [19]
Jarrett

[11] Patent Number: 4,950,076
[45] Date of Patent: Aug. 21, 1990

[54] ALTERNATE APPROACH FOR OBTAINING DYNAMIC RANGE IN MONOPULSE GUIDANCE SYSTEMS

[75] Inventor: Bobby R. Jarrett, Fredericksburg, Va.

[73] Assignee: The United States of America as represented by the Secretary of the Navy, Washington, D.C.

[21] Appl. No.: 723,262

[22] Filed: Sep. 14, 1976

[51] Int. Cl.$^5$ .......................... B01B 11/26; G01C 1/00
[52] U.S. Cl. .................................... 356/152; 244/3.16; 250/214 A; 250/342; 250/210; 307/264; 307/311; 307/492; 330/110; 356/141
[58] Field of Search ................... 244/3.16; 250/214 R, 250/214 A, 342, 208; 307/237, 264, 311; 333/14; 330/110; 356/141, 152; 343/7 AG, 16 M

[56] References Cited

U.S. PATENT DOCUMENTS

| | | | |
|---|---|---|---|
| 3,320,532 | 5/1967 | Watters | 330/110 |
| 3,398,373 | 8/1968 | Caswell | 307/237 |
| 3,502,903 | 3/1970 | Wade | 307/237 |
| 3,600,589 | 8/1971 | Hanson | 307/311 |
| 3,897,917 | 8/1975 | Johnson | 244/3.16 |
| 3,954,340 | 5/1976 | Blomquist | 356/152 |

Primary Examiner—Stephen C. Buczinski
Attorney, Agent, or Firm—John D. Lewis; Kenneth E. Walden

[57] ABSTRACT

A system for improving the dynamic range of guidance systems for missiles and bombs by replacing pseudo-logarithmic amplifiers in the processing circuits with transimpedance amplifiers having feed back impedance operating in conjunction with lower bandwidth type logarithmic amplifiers in the log of the ratio circuits.

10 Claims, No Drawings

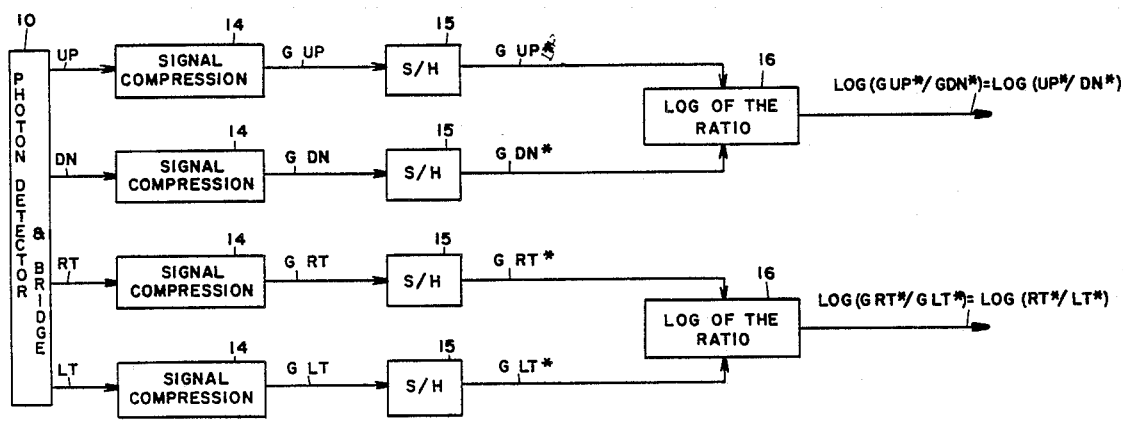

ALTERNATE APPROACH FOR OBTAINING DYNAMIC RANGE IN MONOPULSE GUIDANCE SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In guidance systems for missiles and bombs there is a requirement for considerable dynamic range i.e., the range of input signal strength usable without saturation of the guidance circuits, due to the inverse square of the distance ($1/R^2$) signal strength relationship.

Adequate dynamic range is normally obtained by using logarithmic amplifiers in the processing circuits. These log amplifiers, for the most part pulse video, do not readily lend themselves to implementation in the monolithic technology. They are built with high quality discretes that must be selected to match characteristics such as offset, gain, etc. and made to track over temperature.

Fast rise-time logarithmic video amplifiers use a summation approach to approximate the logarithmic function. As such, they are really pseudologarithmic amplifiers. They are generally implemented by a multistage parallel-summation technique. Each stage of a generalized logarithmic amplifier consists of a linear amplifier, an attenuator, and a logarithmic amplifier (normally a basic video stage), that has logarithmic characteristics over a limited span of the total dynamic range. The linear amplifiers and attenuators are selected to phase in each logarithmic stage sequentially as a function of input intensity. The stages generally provide from 15 to 20 db dynamic range each.

The technique presently used for logarithmic processing of the guidance signals in monopulse receivers for missiles, bombs and guided projectiles utilizes log amps, sample/hold circuits, peak detector circuits or track and hold circuits and difference circuits. The log amps must have adequate bandwidth to process the input pulse, which can be as narrow as a few tens of nanoseconds, and must provide gain matched outputs for dynamic ranges up to 100db. The output of the difference circuit is a signal that is dependent only on the ratio of the inputs. Thus, the range related $1/R^2$ dependency is removed, and the output provides angle information only.

SUMMARY OF THE INVENTION

The invention improves the dynamic range of guidance systems for missiles and bombs by replacing pseudo-logarithmic amplifiers in the processing circuits with signal compression networks such as transimpedance amplifiers with feedback inpedance. Lower bandwidth type logarithmic amplifiers in the log of the ratio circuits operate on the held or peak value of the pulse instead of the pulse itself.

STATEMENT OF THE OBJECTS OF THE INVENTION

An object of the invention is to provide an economical system compatible with monolithic electronic technology.

Another object of the invention is to provide a low noise, more accurate and higher speed circuit for obtaining dynamic range.

Other objects, advantages features of the invention will become apparent from the following detailed description of the invention when considered in conjunction with the accompanying drawings.

DETAILED DESCRIPTION OF THE INVENTION

Figure 1:
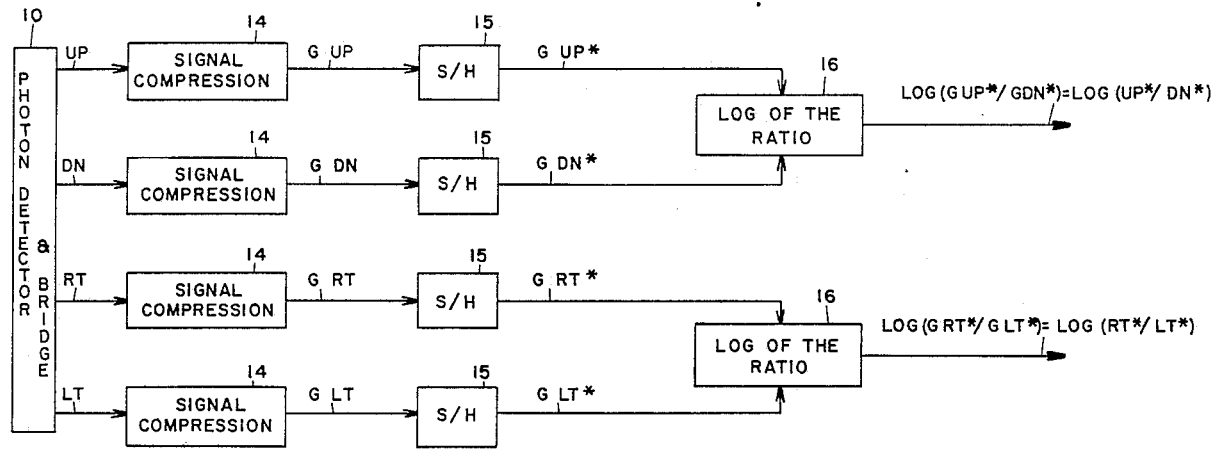
FIG. 1 is a schematic of the general system for obtaining dynamic range.

FIG. 1 illustrates the general system employing the lower bandwidth type log amp. The guidance system photon detector and bridge circuit 10, feeds up, down, left and right signals into signal compression circuits 14. The outputs GUP, GDN, GRT, GLT of the signal compression circuits 14, wherein G represents the gain transfer function, are fed into a sample/hold circuit 15, such as a peak detector circuit or a track and hold circuit. The outputs GUP*, GDN*, GRT*, GLT* of the sample/hold circuits 15 wherein * represents the sampled quantity, are fed into log of the ratio circuits or difference of the logs circuits 16. The resultant outputs of circuits 16 are $$\log\left(\frac{UP^*}{DN^*}\right) \text{ and } \log\left(\frac{RT^*}{LT^*}\right).$$

Figure 2:
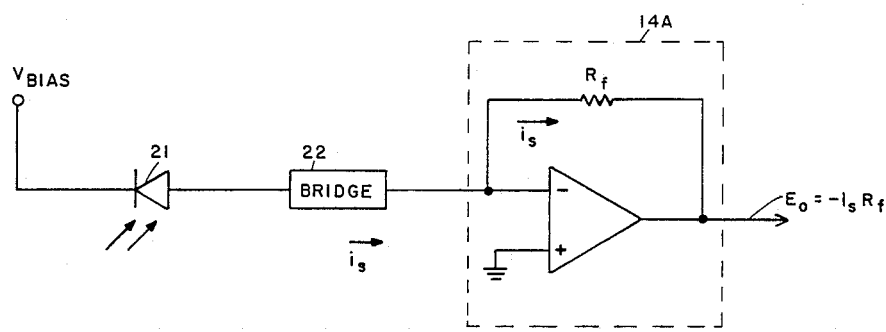
FIG. 2 is a schematic of a transimpedance amplifier current to voltage conversion of the diode output.

In a laser guided monopulse system using four-quadrant photon diode detection, one method of amplifying the diode output is to use a current to voltage converter such as a transimpedance amplifier circuit 14A as a signal compression circuit 14. FIG. 2 is representative of any one of the four channels, left, right, up or down. The output of the back-biased diode 21 in the photon detector is fed to a transimpedance amplifier 14A through the bridge 22. The back-biased diode 21 acts like a classical current source and the current through the resistance $R_f$ is independent of the value of the resistance $R_f$ if the usual op amp considerations are involved (resistance $R_{in} \simeq \infty$, resistance $R_o \simeq 0$, and the open loop gain $A_V \simeq \infty$).

Figure 3:
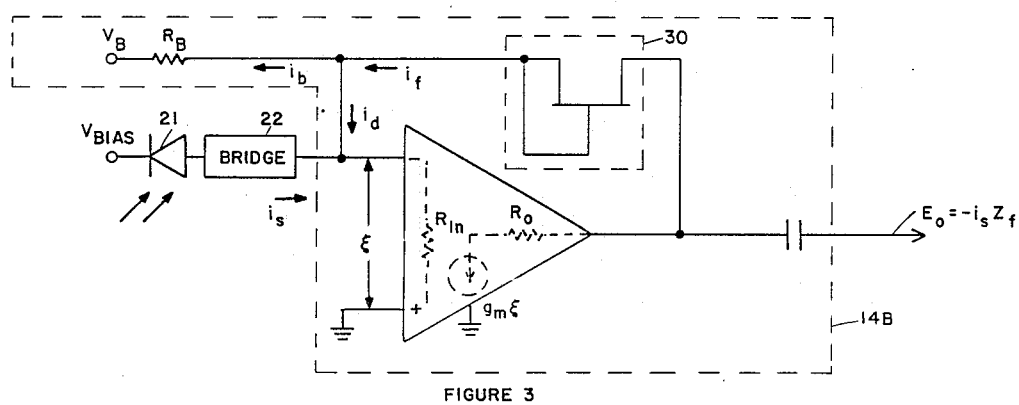
FIG. 3 is a schematic of a transimpedance amplifier utilizing a $V_{GS}=K$ connected FET.

In order to get better signal compression, resistance $R_f$ could be non-linear. An FET has non-linear impedance when operated below pinch-off in the "conductance modulation" region. See FIG. 3 where a transimpedance amplifier circuit 14B having a $V_{GS}=K$ (constant gate to source voltage) connected FET (field effect transistor) is used as the signal compression circuit 14. In order for a $V_{GS}=K$ connected FET 30 with an impedance $Z_f$ to provide the decreasing impedance profile desired, the transimpedance amplifier must be pre-biased to a point above the knee of the $V_{GS}=K$ curve. This can be done by summing a bias input with the signal input as shown in FIG. 3. The offset could also be obtained by biasing from the output side. However, the former approach corresponds to the summing point, summing amplifier, virtual ground concept invoked for operational amplifiers and analog computing and works very well as long as the error voltage e is small.

Figure 4:
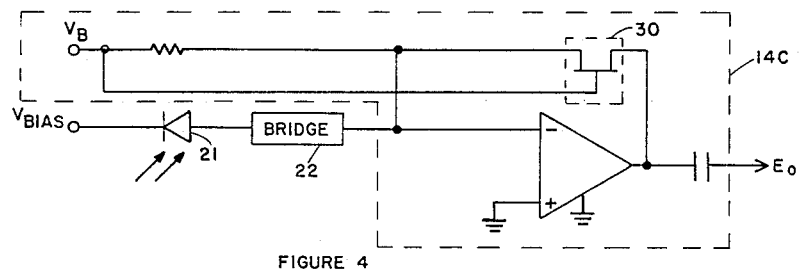
FIG. 4 is a schematic of a transimpedance amplifier utilizing an enhancement mode FET.

FIG. 4 shows a transimpedance amplifier circuit 14C with an FET 30 connection suitable for enhancement devices such as DMOS.

Figure 5:
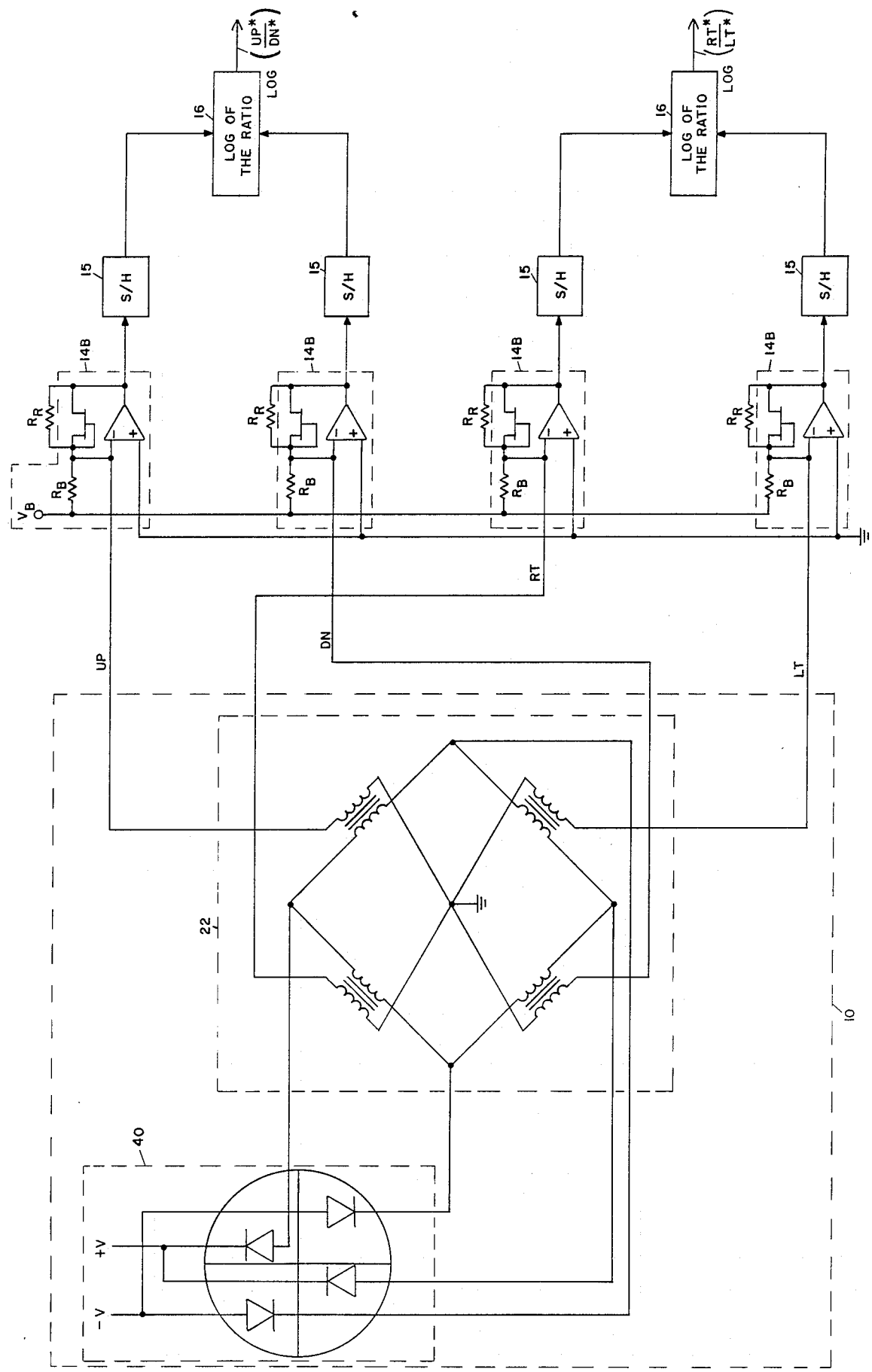
FIG. 5 is a schematic of a system implementation of the $V_{GS}=K$ connected FETs.

A system implementation could take the form shown in FIG. 5. Each of the variable gain monopulse quadrant photo diode amplifiers 14B can be biased to the same value.

If the usual assumptions on open-loop gain and input and output impedance are reasonably well met, the matching of the four channels can be made to depend almost entirely on the matching of the diodes that make up the four quadrant detector 40 and on the FETs 30 used as the feedback elements.

By using integrated circuit FETs where all four FETs are made at the same time on the same substrate, the matching of the $V_{GS}=K$ characteristic curves for the four FETs can be made to depend almost entirely on the ratio of the device sizes, which can be precisely controlled by the photolithic process.

Since it is difficult to use the entire impedance range of the FET and since matching beyond pinch-off may degrade somewhat, a range limiting resistor $R_R$ (FIG. 5) could be used to lower the upper value of impedance $Z_f$ to about 5K in order that the output $E_o$ could be held to less than 10 volts for typical ranges of diode currents.

Since the impedance $Z_f$ is the slope of the $V_{GS}=K$ curve, taking the log of the ratio, $$\log\left(\frac{GUP^*}{GDN^*}\right),$$

G will not necessarily be the same function for the two channels. It will only be the same when both channels operate at the same point on the characteristic curve. However, there is no impairment of consequence to the overall guidance, due to the geometry of the encounter. There will be some error at initial acquisition due to the difference between the slopes of the curves at the operating points. Note that the guidance will act in the direction to remove the error (servo action) and that the slope (dynamic resistance) of the curves are essentially constant below the "knee" which is the case for the middle and end portion of the flight.

An alternate approach would be to use automatic gain control (agc) for the signal compression. In conventional (nonintegrated) amplifiers, agc is quite often obtained by shifting the dc operating point of one or more stages or by employing diode attenuators. Types of wide-band circuits readily suited to agc applications are the "balanced" and "double-balanced" modulators. These wide band circuits could be used in a pseudo-agc fashion where the output is used as the agc control value.

Obviously many modifications and variations of the present invention are possible in the light of the above teachings. It is therefore to be understood that within the scope of the appended claims the invention may be practiced otherwise than as specifically described.

What is claimed is:

1. A circuit for logrithmic processing of guidance signals with improved dynamic range comprising:
    a four quadrant photon detector wherein the photon energy input is converted to electrical energy;
    a bridge connected to said detector for combining adjacent quadrant signals to provide spatially resolved output channels;
    a plurality of transimpedance amplifiers, each amplifier having a feedback impedance with one transimpedance amplifier connected to each spatially resolved bridge output channel, each transimpedance amplifier converting said photon detector current output to a voltage signal;
    a plurality of sample/hold circuits, one connected to each transimpedance amplifier voltage signal output wherein the amplitude of the voltage signal output pulse is held; and
    a pair of log of the ratio circuits, each log of the ratio circuit being connected to a pair of opposed spatially resolved sample/hold circuits, said log circuits determining the relative angle information for guidance.

2. The device of claim 1 wherein said bridge is a transformer.

3. The device of claim 1 wherein each said transimpedance amplifier has a non-linear feedback impedance.

4. The device of claim 2 wherein each said transimpedance amplifier has a non-linear feedback impedance.

5. The device of claim 3 wherein said non-linear feedback impedance is a constant gate to source voltage connected field effect transistor.

6. The device of claim 4 wherein said non-linear feedback inpedance is a constant gate to source voltage field effect transistor.

7. The device of claim 3 wherein said non-linear feedback impedance is an enhancement mode field effect transistor.

8. The device of claim 4 wherein said non-linear feedback impedance is an enhancement mode field effect transistor.

9. The device of claim 5 wherein each said transimpedance amplifier is pre-biased to a point above the knee of the constant gate to source voltage curve.

10. The device of claim 6 wherein each said transimpedance amplifier is pre-biased to a point above the knee of the constant gate to source voltage curve.

* * * * *